US012801166B2

(12) United States Patent
Tsai et al.

(10) Patent No.: US 12,801,166 B2
(45) Date of Patent: Nov. 17, 2026

(54) LIQUID VOLUME CONTROL DEVICE AND CONTROL METHOD FOR LIQUID VOLUME USING THE SAME

(71) Applicant: Inventec Appliances Corp., New Taipei City (TW)

(72) Inventors: Arthur Tsai, New Taipei City (TW); Tsung-Yang Ho, New Taipei City (TW)

(73) Assignee: INVENTEC APPLIANCES CORP., New Taipei City (TW)

(*) Notice: Subject to any disclaimer, the term of this patent is extended or adjusted under 35 U.S.C. 154(b) by 205 days.

(21) Appl. No.: 19/014,702

(22) Filed: Jan. 9, 2025

(65) Prior Publication Data

US 2026/0064138 A1 Mar. 5, 2026

(30) Foreign Application Priority Data

Sep. 2, 2024 (TW) ................................ 113133068

(51) Int. Cl.
*G05D 9/12* (2006.01)
*B01L 3/02* (2006.01)

(52) U.S. Cl.
CPC ............. *G05D 9/12* (2013.01); *B01L 3/0213* (2013.01); *B01L 2200/0605* (2013.01); *B01L 2200/14* (2013.01); *B01L 2400/049* (2013.01)

(58) Field of Classification Search
CPC . G05D 9/12; B01L 3/0213; B01L 2200/0605; B01L 2200/14; B01L 2400/049
See application file for complete search history.

(56) References Cited

U.S. PATENT DOCUMENTS

| | | | | |
|---|---|---|---|---|
| 11,517,895 | B2 | 12/2022 | Tseng et al. | |
| 2016/0202281 | A1* | 7/2016 | Fang | B01L 3/50273 506/10 |
| 2021/0069693 | A1* | 3/2021 | Tseng | G01N 35/1016 |

FOREIGN PATENT DOCUMENTS

| | | | |
|---|---|---|---|
| CN | 110564600 | A | 12/2019 |
| CN | 110529355 | B | 5/2021 |

* cited by examiner

*Primary Examiner* — Laura Martin Sweeney
*Assistant Examiner* — Anthony W Megna Fuentes
(74) *Attorney, Agent, or Firm* — McClure, Qualey & Rodack, LLP

(57) ABSTRACT

A liquid volume control device for controlling a liquid volume of a liquid in a test tube includes a pump, a driver, a transfer device, a camera and a controller. The pump is connected to a pipette, used to suck the liquid out of a test tube. The driver is connected to the pump and used to drive the pump. The transfer device is used to transfer the test tube. The camera is used to capture a first image of a suction end of the pipette and a second image of the liquid in the test tube. When the first image is captured, the test tube is outside a capture area of the camera. When the second image is captured, the test tube is inside the capture area of the camera. The controller is electrically connected to the camera, the transfer device, the driver and the pump.

10 Claims, 6 Drawing Sheets

LIQUID VOLUME CONTROL DEVICE AND CONTROL METHOD FOR LIQUID VOLUME USING THE SAME

This application claims the benefit of Taiwan application Serial No. 113133068, filed Sep. 2, 2024, the subject matter of which is incorporated herein by reference.

BACKGROUND OF THE INVENTION

Field of the Invention

The invention relates in general to a control device and a control method for using the same, and more particularly to a liquid volume control device and a control method for liquid volume using the same.

Description of the Related Art

Liquid volume control devices can suck the liquid in the test tube, and finally control the remaining volume of liquid in the test tube to a target preset volume. However, current liquid volume control devices still face the problem of precise control of the suction volume, resulting in a non-negligible deviation between the remaining volume of liquid in the test tube and the target preset volume.

SUMMARY OF THE INVENTION

The invention is directed to a liquid volume control device and a liquid volume control method using the liquid volume control device, which can reduce the difference between the remaining volume of liquid in the test tube and the target preset volume, and improve the accuracy of liquid extraction.

According to one embodiment of the present invention, a liquid volume control device for controlling a liquid volume of a liquid in a test tube is provided. The liquid volume control device includes a pump, a driver, a transfer device, a camera and a controller. The pump is connected to a pipette, which is used to suck the liquid out of a test tube. The driver is connected to the pump and used to drive the pump. The transfer device is used to transfer the test tube. The camera is used to capture a first image of a suction end of the pipette and a second image of the liquid in the test tube. The controller is electrically connected to the camera, the transfer device, the driver and the pump, and used to: (1) control the driver to drive the suction end of the pipette into a capture area of the camera, and analyze the first image to determine a height compensation value of the suction end of the pipette; (2) analyze the second image to determine a total volume of the liquid, and calculate a first insertion depth of the pipette according to the total volume and a specified retention volume; (3) calculate a second insertion depth according to the first insertion depth and the height compensation value; (4) control the driver to drive the suction end of the pipette into the liquid to the second insertion depth; and (5) control the pump to suck the liquid in the test tube through the pipette.

According to another embodiment of the present invention, a liquid volume control method for controlling a liquid volume of a liquid in a test tube is provided. The liquid volume control method includes the following steps: providing the liquid volume control device stated above; controlling the driver to drive the suction end of the pipette into the capture area of the camera by the controller; capturing the first image of the suction end of the pipette by the camera; analyzing the first image to determine the height compensation value of the suction end of the pipette by the controller; capturing the second image of the liquid in the test tube by the camera; analyzing the second image to determine the total volume of the liquid, and calculating the first insertion depth of the pipette according to the total volume and the specified retention volume by the controller; calculating the second insertion depth according to the first insertion depth and the height compensation value by the controller; controlling the driver to drive the suction end of the pipette into the liquid to the second insertion depth by the controller; and controlling the pump to suck the liquid in the test tube through the pipette by the controller.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
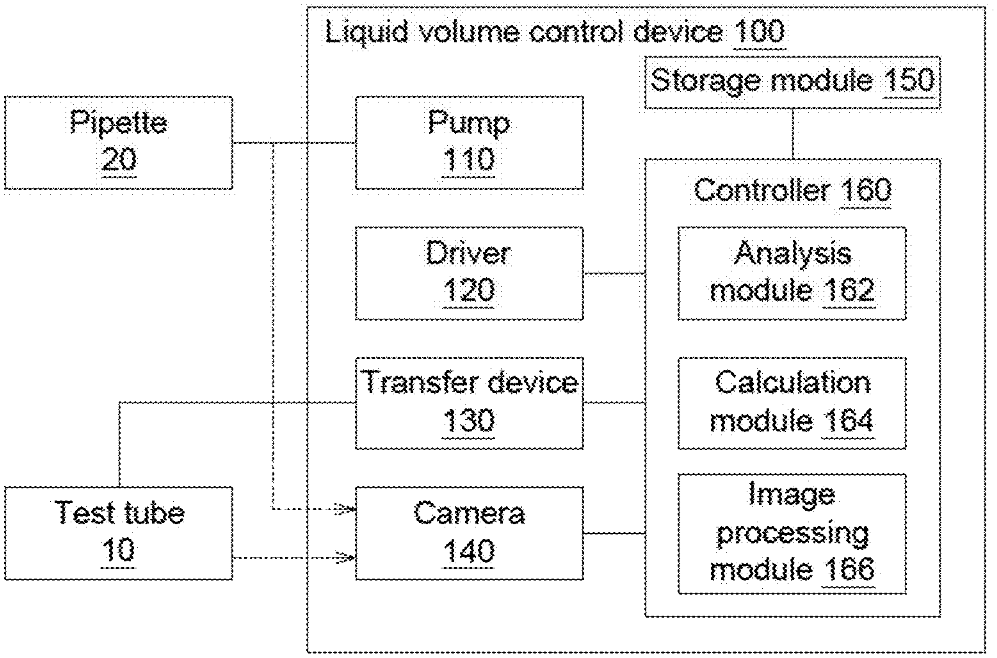
FIG. 1 illustrates a functional block diagram of a liquid volume control device according to an embodiment of the present invention.

Please refer to FIGS. 1 to 5. A liquid volume control device 100 is used to control the liquid volume of liquid L in a test tube 10, so that the final liquid remaining volume in the test tube 10 is precisely controlled at a target preset volume. The liquid volume control device 100 includes a pump 110, a driver 120, a transfer device 130, a camera 140, a storage module 150 and a controller 160. In one embodiment, the controller 160 may include an analysis module 162, a calculation module 164, and an image processing module 166.

The pump 110 is used to connect the pipette 20 to suck the liquid L out of the test tube 10. The driver 120 is connected to the pump 110 to drive the pump 110 to move. The transfer device 130 is used to transfer the test tube 10. The camera 140 is adjacent to the transfer device 130 and is used to capture a first image M1 of a suction end 20*t* of the pipette 20 and a second image M2 of the liquid L within the test tube 10. When the first image M1 is captured, the test tube 10 is positioned outside a capture area of the camera 140; when the second image M2 is captured, the test tube 10 is located within the capture area of the camera 140. The transfer device 130 is used to transfer the test tube 10, for example, to transfer the test tube 10 from outside the capture area of the camera 140 to within the capture area of the camera 140.

In the present embodiment, the transfer device 130 is a circular turntable, and has perforations 130*a*. The controller 160 is electrically connected to the storage module 150, the camera 140, the transfer device 130, the driver 120 and the pump 110, and is used to: (1) control the driver 120 to drive the pipette 20, and analyze the first image M1, to determine a height compensation value HD between the suction end 20*t* of the pipette 20 and a suction end of a standard pipette; (2) analyze the second image M2 to determine a total volume of the liquid L, and calculate a first insertion depth D1 of the pipette 20 according to the total volume and a specified retention volume; (3) calculate a second insertion depth D2 according to the first insertion depth D1 and the height compensation value HD; (4) control the driver 120 to drive the suction end 20*t* of the pipette 20 entering the liquid L to a position of the second insertion depth D2; and (5) control the pump 110 to suck the liquid L in the test tube 10 so that the liquid L reaches the specified retention volume.

Figure 5:
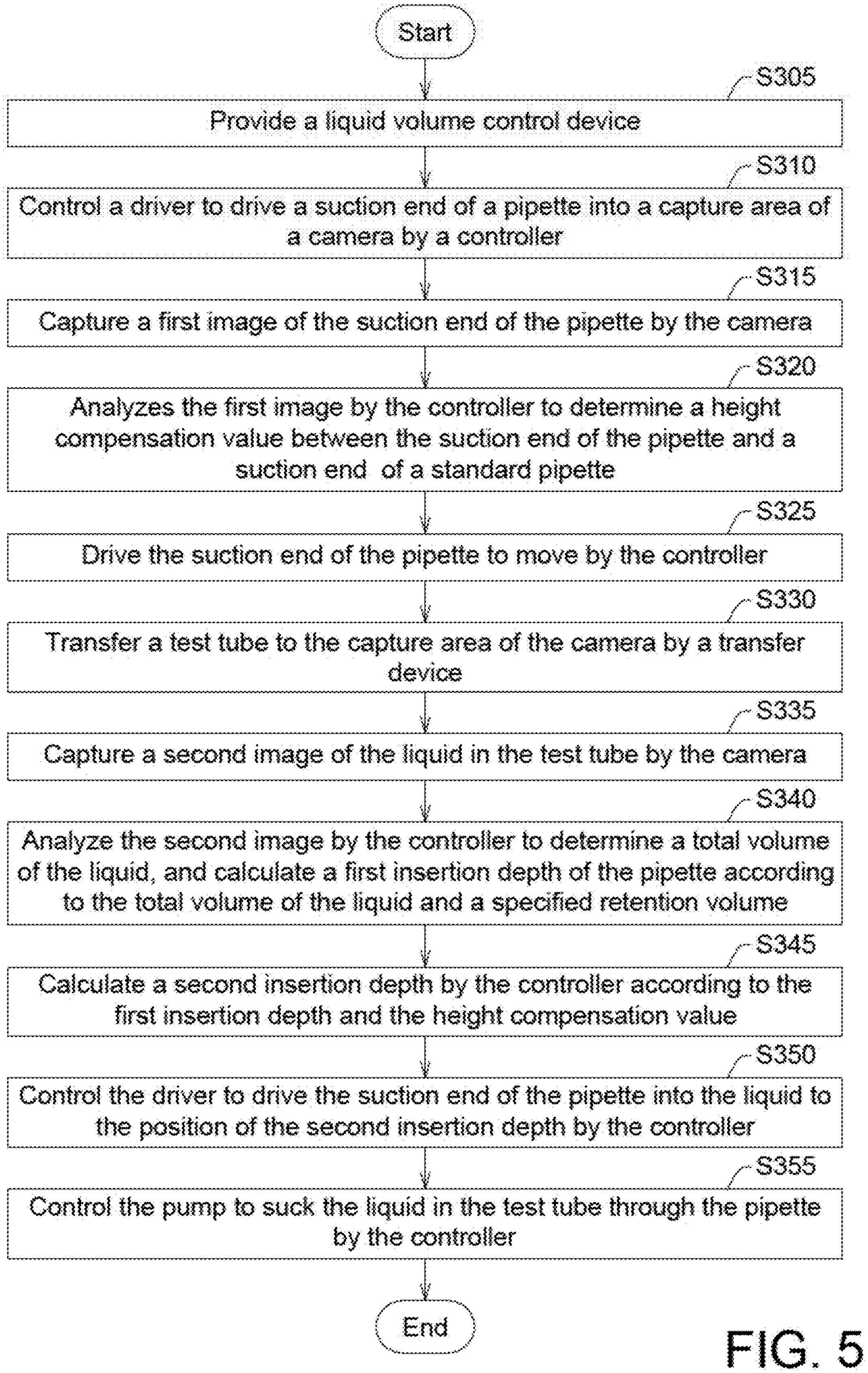
FIG. 5 illustrates a flow chart of a liquid volume control method using the liquid volume control device in FIG. 1.

The following is a further illustration using the process diagram of the liquid volume control method in FIGS. 2A to 2D and the flow chart in FIG. 5.

In step S305, the liquid volume control device 100 is provided. The controller 160 controls the driver 120 to drive the pump 110 to move downward in the direction of the pipette 20, so that the pump 110 and the pipette 20 are combined.

In step S310, the controller 160 controls the driver 120 to drive the suction end 20*t* of the pipette 20 into the capture area of the camera 140. According to the present embodiment, the steps include: the controller 160 controls the driver 120 to drive the pipette 20 to move above the capture area (see FIG. 2A), and the controller 160 controls the driver 120 to drive the pipette 20 to move downward and pass through a perforation 130*a* of the transfer device 130, allowing the pipette 20 to enter the capture area (see FIG. 2B).

In step S315, after the suction end 20*t* enters the capture area, a first image M1 of the suction end 20*t* of the pipette 20 is captured by the camera 140. The camera 140 may transmit the information of the first image M1 to the controller 160.

In step S320, the controller 160 analyzes the first image M1 to determine a height compensation value HD between the suction end 20*t* of the pipette 20 and a suction end Dt of the standard pipette STD. In one embodiment, the height relationship between the suction end Dt of the standard pipette STD and a reference plane P1 is known for the controller 160. That is, the controller 160 can obtain a position data of a standard height BL of the suction end Dt.

According to some embodiments, the camera 140 can pre-capture a standard image after the suction end Dt of the standard pipette STD enters the capture area, so as to obtain a position of the standard height BL of the suction end Dt of the standard pipette STD. In some embodiments, the position of the standard height BL can be obtained before step S305 is performed, and the data of the standard height BL can be stored by the storage module 150.

Figure 3:
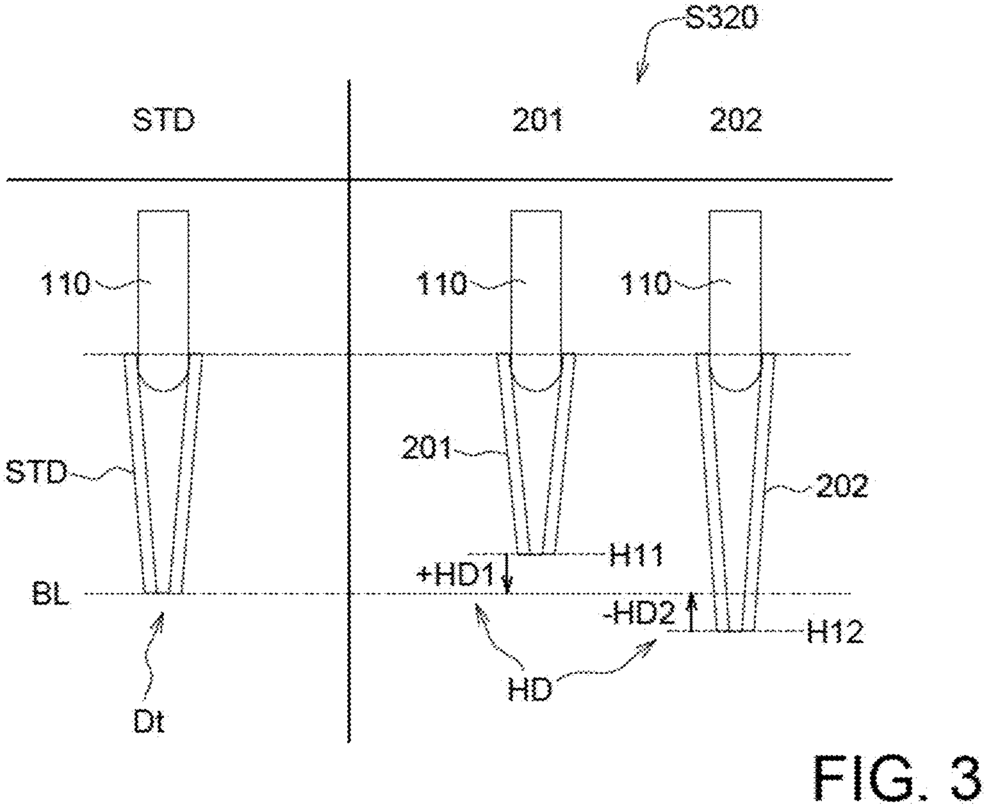
FIG. 3 illustrates a method of analyzing a height compensation value in the liquid volume control method in FIG. 2B.

Please continue to refer to FIG. 3 to further understand step S320. According to an embodiment, the pipette 20 is a pipette 201. In step S320, the controller 160 (such as the analysis module 162) is used to determine the position of a first height H11 of the suction end of the pipette 201 in the first image M1, and the controller 160 (such as the calculation module 164) is used to calculate a height compensation value +HD1 between the first height H11 and the standard height BL. In other words, the height compensation value +HD1 is the difference between the first height H11 and the standard height BL. Since the first height H11 is greater than the standard height BL, the height compensation value is represented by the symbol "+". According to another embodiment, the pipette 20 is a pipette 202. In step S320, the controller 160 (such as the analysis module 162) is used to determine the position of a first height H12 of the suction end of the pipette 201 in the first image M1, and the controller 160 (such as the calculation module 164) is used to calculate a height compensation value-HD2 between the first height H12 and the standard height BL. In other words, the height compensation value-HD2 is the difference between the first height H12 and the standard height BL. Since the first height H12 is smaller than the standard height BL, the height compensation value is represented by the symbol "–". In some embodiments, the data of the height compensation value HD may be stored in the storage module 150. In some embodiments, the height compensation value HD may be equal to zero.

In step S325, the controller 160 controls the driver 120 to drive the suction end 20*t* of the pipette 20 to move (for example, rise, return to the position of FIG. 2A) to the suction end 20*t* of the pipette 20 to outside the capture area of the camera 140. In some embodiments, step S325 can be omitted as long as the pipette 20 does not affect the capture of the second image M2.

Figure 2A:
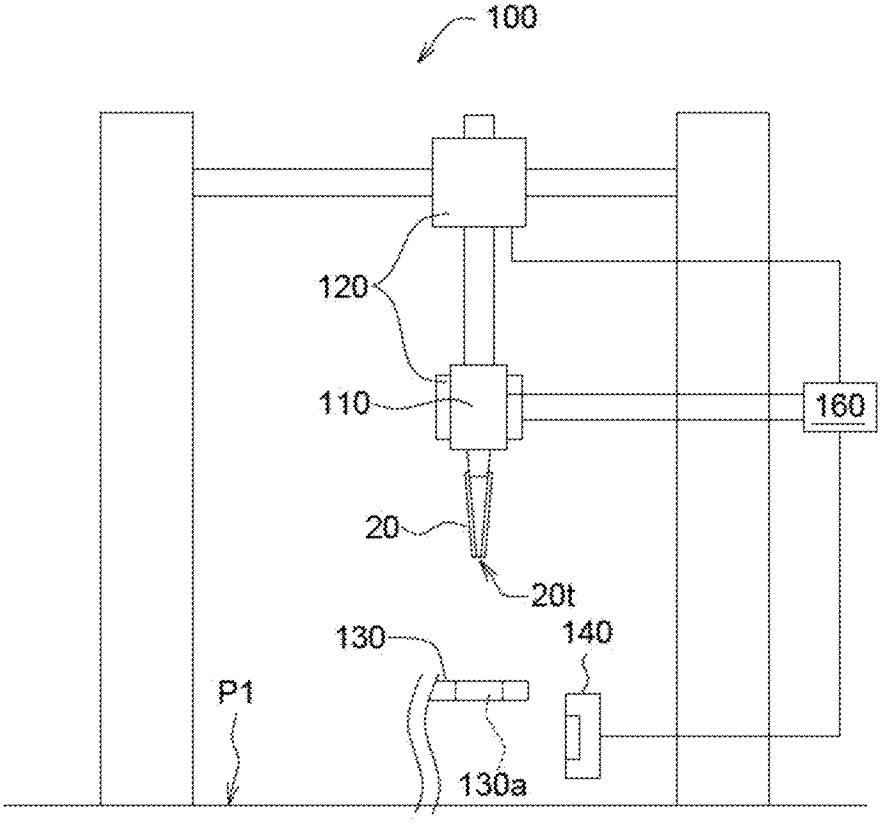
FIGS. 2A to 2D illustrate a process diagram of the liquid volume control method of the liquid volume control device in FIG. 1.
Figure 2B:
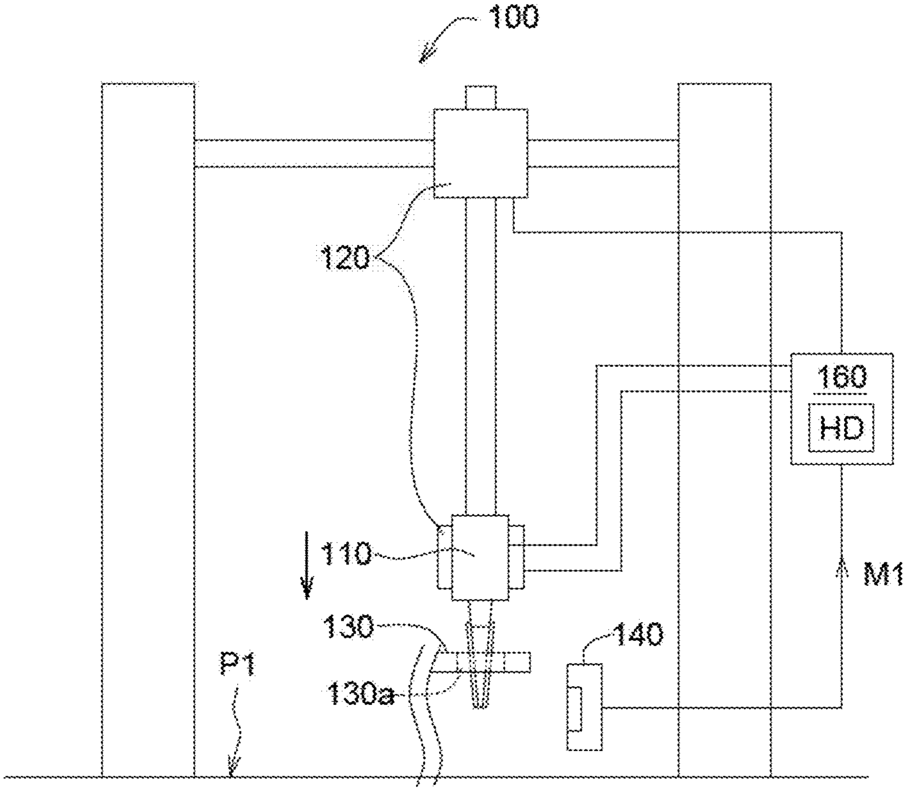
Figure 2C:
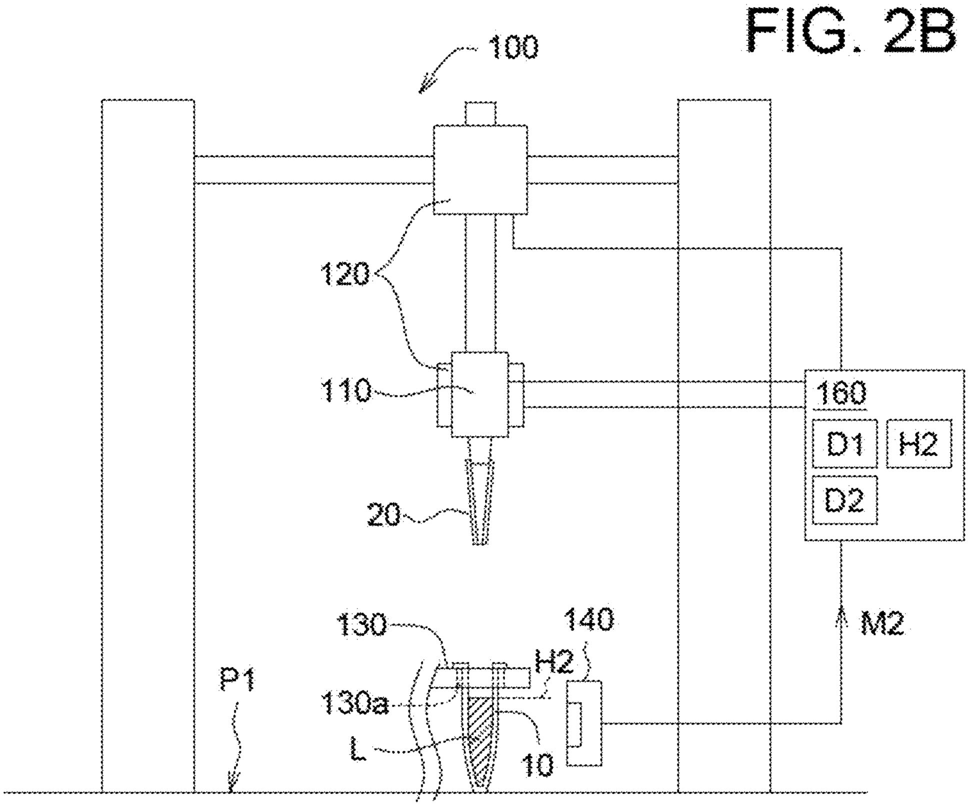

In step S330, the test tube 10 is transferred to the capture area of the camera 140 by the transfer device 130. Referring to FIG. 2C, an upper edge of the test tube 10 is against the transfer device 130, and a lower half of the test tube 10 passes through the perforation 130*a* and enters the capture area of the camera 140.

In step S335, the second image M2 of the liquid L in the test tube 10 is captured by the camera 140. The camera 140 may transmit the information of the second image M2 to the controller 160.

In step S340, the controller 160 analyzes the second image M2 to determine the total volume of the liquid L, and calculates the first insertion depth D1 of the pipette 10 according to the total volume of the liquid L and the specified retention volume. The first insertion depth D1 is, for example, calculated from the liquid surface L. For example, the controller 160 (such as the analysis module 164) is used to determine a second height H2 of the liquid surface L in the second image M2, and the controller 160 (such as the analysis module 164) is used to calculate a total volume of liquid L according to the second height H2, to calculate a liquid extraction volume according to the difference between the total volume and the specified retention volume, and to calculate the liquid extraction position according to the liquid extraction volume. That is, the first insertion depth D1 is calculated. In some embodiments, the second height H2 represents the liquid height between the height of the liquid surface and the height of the inner bottom surface of the test tube 10.

In step S345, the controller 160 calculates the second insertion depth D2 according to the first insertion depth D1 and the height compensation value HD. That is, the second insertion depth D2 is the correct insertion depth after the first insertion depth D1 is corrected by the height compensation value HD. For example, first insertion depth D1–height compensation value HD=second insertion depth D2. The second insertion depth D2 can be calculated from the liquid surface. In some embodiments, the height compensation value HD is equal to 0, then the first insertion depth D1 is equal to the second insertion depth D2.

Figure 2D:
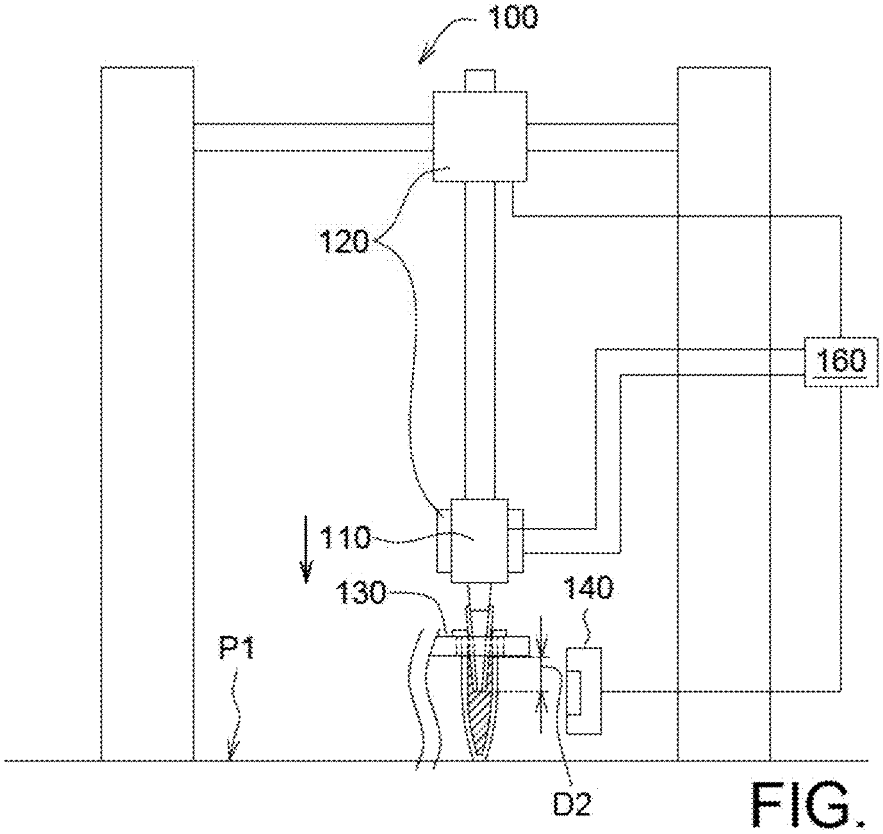

In step S350, the controller 160 controls the driver 120 to drive the suction end 20*t* of the pipette 20 into the liquid L to the position of the second insertion depth D2, see FIG. 2D.

In step S355, the controller 160 controls the pump 110 to suck the liquid L in the test tube 10 through the pipette 20, so that the remaining amount of the liquid L in the test tube 10 reaches the specified retention volume. That is, the liquid L is controlled at the target preset volume.

Figure 4A:
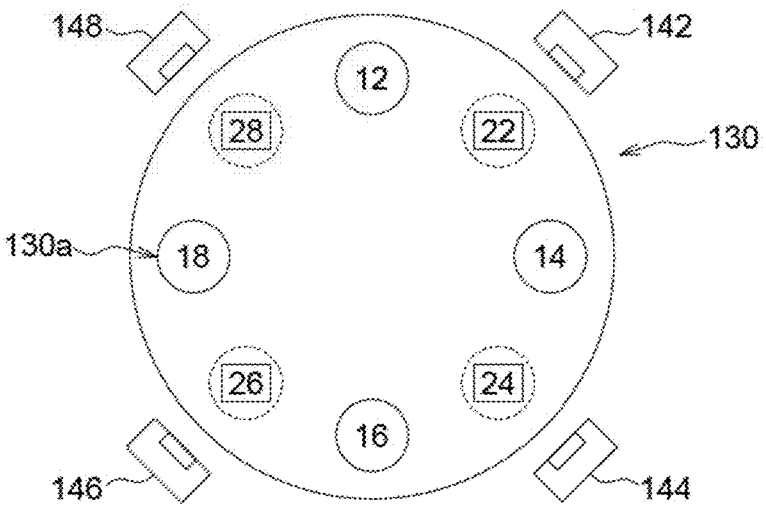
FIGS. 4A and 4B illustrate a transfer process of a transfer device according to an embodiment of the present invention.
Figure 4B:
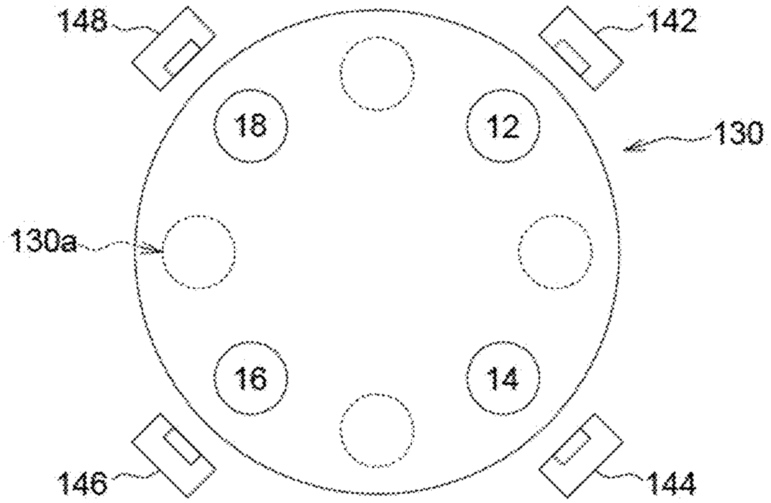

Please refer to FIG. 4A. According to an embodiment, the test tube 10 includes test tubes 12 to 18, and the camera 140 includes cameras 142 to 148. It should be understood that the number of test tubes 10 and cameras 140 of the present invention is not limited to four. The test tubes 12 to 18 are arranged in the transfer device 130 and are located outside the capture area of the cameras 142 to 148. The vacant positions between the test tubes 12 to 18 provide accommodation spaces for pipettes 22 to 28 used to suck liquids from the test tubes 12 to 18, respectively. According to FIGS. 2B and 4A, the suction ends of the pipettes 22 to 28 can enter the capture areas of the cameras 142 to 148 to determine the respective height compensation values HD of the pipettes 22 to 28. According to FIGS. 2C and 4B, the controller 160 can control the driver 120 to drive the pipettes 22 to 28 away from the capture areas (for example, moving the pipettes 22 to 28 upward); the transfer device 130 rotates so that the test tubes 12 to 18 enter capture areas of the cameras 142 to 148. The controller 160 calculates the respective first insertion depths D1 of the test tubes 12 to 18, and then calculates respective second insertion depths D2 according to the respective first insertion depths D1 and the respective height compensation values HD of the test tubes 12 to 18. The controller 160 controls the driver 120 to drive the suction ends of the pipettes 22 to 28 to enter the liquids in the test tubes 12 to 18, respectively, to the positions of the second insertion depths D2 of the test tubes 12 to 18, so that the pump 110 sucks the liquid in test tubes 12 to 18 through the pipettes 22 to 28 to make the liquid reach the specified retention volume.

According to the above embodiment, since the camera 140 captures the first image M1 of the suction end 20*t* of the pipette 20, the controller 140 can determine the height compensation value HD between the suction end 20*t* of the pipette 20 and the suction end Dt of the standard pipette STD. Therefore, the suction end 20*t* of the pipette 20 can enter the liquid L and suck the liquid according to the second insertion depth D2 corrected by the height compensation value HD. Compared to the comparative example without the correction step including the height compensation value HD, the liquid extraction position of the pipette 20 of the present invention is quite precise, and there will be no problem of being too deep or too shallow.

Comparative Examples A to B and Embodiments A to B are specifically mentioned below for experiments to compare the accuracy of liquid extraction by the liquid volume control devices.

In Comparative Examples A to B, the positions of the liquid surfaces in the test tubes are confirmed by taking pictures with the camera, the liquid heights are calculated and then the liquids are sucked, and the above steps are repeated until the liquid heights are less than or equal to the target values, and no correction step for the height compensation value to the liquid extraction position of the pipette was included. Embodiments A to B adopt the process as shown in FIG. 5, which allows the liquid to reach the specified retention volume without repeated photography and aspiration. There were no bubbles or impurities in the liquids of Comparative Example A and Embodiment A. The liquids of Comparative Example B and Example B contain bubbles or impurities. Referring to Table 1 and Table 2, they show the actual retention volumes and error percentages of the liquids in Comparative Example A and Embodiment A when the predetermined retention volume of the liquid is 16 microliters. Referring to Table 3 and Table 4, they show the actual retention volumes and error percentages of the liquids in Comparative Example B and Embodiment B when the predetermined retention volume of the liquid is 16 microliters.

TABLE 1

| Sample No. | Comparative Example A actual retention volume | Comparative Example A error percentage (%) |
|---|---|---|
| 1 | 17.4 μL | 8.75% |
| 2 | 16.8 μL | 5.00% |
| 3 | 15.5 μL | 3.13% |
| 4 | 17.2 μL | 7.50% |
| 5 | 16.3 μL | 1.88% |
| average | 16.64 μL | 5.25% |

TABLE 2

| Sample No. | Embodiment A actual retention volume | Embodiment A error percentage (%) |
|---|---|---|
| 11 | 16.3 μL | 1.88% |
| 12 | 16.1 μL | 0.63% |
| 13 | 15.6 μL | 2.50% |
| 14 | 16.8 μL | 5.00% |
| 15 | 15.5 μL | 3.13% |
| average | 16.06 μL | 2.63% |

TABLE 3

| Sample No. | Comparative Example B actual retention volume | Comparative Example B error percentage (%) |
|---|---|---|
| 1 | 20.2 μL | 26.25% |
| 2 | 18.7 μL | 16.87% |
| 3 | 21.0 μL | 31.25% |
| 4 | 20.6 μL | 28.75% |
| 5 | 18.3 μL | 14.73% |
| average | 19.76 μL | 23.57% |

TABLE 4

| Sample No. | Embodiment B actual retention volume | Embodiment B error percentage (%) |
|---|---|---|
| 11 | 17.9 μL | 11.87% |
| 12 | 17.1 μL | 6.87% |
| 13 | 18.5 μL | 15.62% |
| 14 | 17.8 μL | 11.25% |
| 15 | 18.9 μL | 18.12% |
| average | 18.04 μL | 12.75% |

Figure 6A:
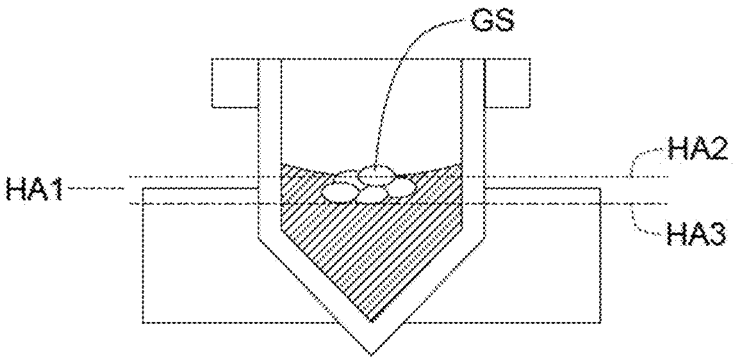
FIG. 6A illustrates a schematic diagram of a test tube of a liquid volume control device according to a comparative example.
Figure 6B:
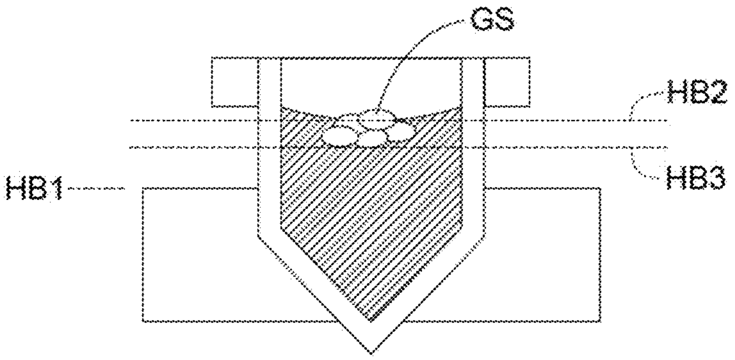
FIG. 6B illustrates a schematic diagram of the test tube of the liquid volume control device in FIG. 1.

In fact, when there are bubbles in the test tube, it will cause errors in the judgment of the liquid level, and the less liquid in the test tube, the greater the error caused by the bubbles. As shown in FIG. 6A, a target height of the liquid is HA1, an actual height of the liquid is HA2, and a recognition height of the liquid determined by the controller according to the image is HA3 (the recognition height HA3 is located below the bubbles GS), and the recognition height HA3 is less than the target height is HA1, so the liquid extraction is stopped. During the last liquid extraction process, assuming that the system error value is 5 μL, the remaining volume of liquid is 40 μL, and the error percentage of liquid extraction=5/40=12.5%; as shown in FIG. 6B, the target height of the liquid is HB1, the actual height of the liquid is HB2, and the recognition height of the liquid determined by the controller according to the image is HB3 (the recognition height HB3 is located below the bubbles GS). Assume that the system error value is 5 μL, the remaining volume of liquid is 80 μL, and the error percentage of liquid extraction is 5/80=6.3%.

In addition, in the liquid extraction methods of Comparative Examples A to B, the time to suck liquid is about 15 minutes; in the liquid extraction methods of Embodiments A to B of the present invention, the time to suck liquid is only 5 minutes. Compared with comparative examples A to B, the time is reduced by 67%.

In short, the liquid volume control device according to one embodiment of the present invention and the liquid volume control method using the liquid volume control device have the following advantages: (1) the influence of the tolerance of the pipette on the liquid extraction position can be compensated, the risk of mistakenly removing the detection target and the problem of being unable to effectively extract liquids can be reduced; (2) the number of times of testing, analysis and liquid extraction is less, so the time required for the process flow is reduced; and (3) the liquid height of liquid needs to be determined only before the liquid extraction, thus reducing the impact of bubbles, impurities or precipitation on the judgment of liquid height.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid volume control device for controlling a liquid volume of a liquid in a test tube, the liquid volume control device comprises:

- a pump connected to a pipette for sucking the liquid out of the test tube;
- a driver connected to the pump and used to drive the pump;
- a transfer device for transferring the test tube;
- a camera for capturing a first image of a suction end of the pipette and a second image of the liquid in the test tube; and
- a controller electrically connected to the camera, the transfer device, the driver and the pump, and used to:
  - control the driver to drive the suction end of the pipette into a capture area of the camera, and analyze the first image to determine a height compensation value of the suction end of the pipette;
  - analyze the second image to determine a total volume of the liquid, and calculate a first insertion depth of the pipette according to the total volume and a specified retention volume;
  - calculate a second insertion depth according to the first insertion depth and the height compensation value;
  - control the driver to drive the suction end of the pipette into the liquid to the second insertion depth; and
  - control the pump to suck the liquid in the test tube through the pipette.

2. The liquid volume control device according to claim 1, further comprising a storage module electrically connected to the controller, and the storage module used to store data of a standard height of a suction end of a standard pipette, wherein the controller is further used to: determine a first height of the suction end of the pipette in the first image; calculate the height compensation value based on a difference between the first height and the standard height; determine a second height of a liquid surface in the second image; calculate the total volume of the liquid according to the second height; calculate a liquid extraction volume according to the total volume and the specified retention volume; and calculate the first insertion depth according to the liquid extraction volume.

3. The liquid volume control device according to claim 2, wherein the controller comprises an analysis module, a calculation module and an image processing module, wherein the analysis module is used to determine a position of the first height of the suction end of the pipette in the first image and to determine a position of the liquid surface in the second image, wherein the calculation module is used to calculate the height compensation value based on the difference between the first height and the standard height, calculate the total volume of the liquid based on the second height, calculate the liquid extraction volume based on the total volume and the specified retention volume, and calculate the first insertion depth according to the liquid extraction volume.

4. The liquid volume control device according to claim 1, wherein the first insertion depth and the second insertion depth are measured from a position of a liquid surface.

5. A liquid volume control method for controlling a liquid volume of a liquid in a test tube, the liquid volume control method comprises:

- providing the liquid volume control device according to claim 1;
- controlling the driver to drive the suction end of the pipette into the capture area of the camera by the controller;
- capturing the first image of the suction end of the pipette by the camera;
- analyzing the first image to determine the height compensation value of the suction end of the pipette by the controller;
- capturing the second image of the liquid in the test tube by the camera;
- analyzing the second image to determine the total volume of the liquid, and calculating the first insertion depth of the pipette according to the total volume and the specified retention volume by the controller;
- calculating the second insertion depth according to the first insertion depth and the height compensation value by the controller;
- controlling the driver to drive the suction end of the pipette into the liquid to the second insertion depth by the controller; and
- controlling the pump to suck the liquid in the test tube through the pipette by the controller.

6. The liquid volume control method according to claim 5, further comprising storing data on a standard height of a suction end of a standard pipette by a storage module, wherein the storage module is electrically connected to the controller; the controller is further used to: determine a first height of the suction end of the pipette in the first image; calculate the height compensation value between the first height and the standard height; determine a second height of a liquid surface in the second image; calculate the total volume of the liquid according to the second height; calculate a liquid extraction volume according to the total volume and the specified retention volume; and calculate the first insertion depth according to the liquid extraction volume.

7. The liquid volume control method according to claim 6, wherein the controller comprises an analysis module, a calculation module and an image processing module, wherein the analysis module is used to determine a position of the first height of the suction end of the pipette in the first image and to determine a position of the liquid surface in the second image, wherein the calculation module is used to calculate the height compensation value between the first height and the standard height, calculate the total volume of the liquid based on to the second height, calculate the liquid extraction volume based on the total volume and the specified retention volume, and calculate the first insertion depth based on the liquid extraction volume.

8. The liquid volume control method according to claim 5, wherein the first insertion depth and the second insertion depth are calculated from a position of a liquid surface.

9. The liquid volume control method according to claim 5, wherein the step of capturing the first image and the step of analyzing the first image are performed before the step of capturing the second image.

10. The liquid volume control method according to claim 5, further comprising transferring the test tube to the capture area of the camera by the transfer device.

* * * * *